(12) United States Patent
Wang et al.

(10) Patent No.: US 9,105,992 B2
(45) Date of Patent: Aug. 11, 2015

(54) CONNECTOR AND THE METHOD FOR ASSEMBLING

(71) Applicant: Acer Incorporated, New Taipei (TW)

(72) Inventors: Yu-Shih Wang, New Taipei (TW); Cheng-Nan Ling, New Taipei (TW); Yi-Ta Huang, New Taipei (TW)

(73) Assignee: Acer Incorporated, New Taipei (TW)

( * ) Notice: Subject to any disclaimer, the term of this patent is extended or adjusted under 35 U.S.C. 154(b) by 158 days.

(21) Appl. No.: 13/936,223

(22) Filed: Jul. 8, 2013

(65) Prior Publication Data

US 2014/0322928 A1 Oct. 30, 2014

(30) Foreign Application Priority Data

Apr. 26, 2013 (TW) .............................. 102115074 A (51) Int. Cl.
| | |
|---|---|
| *H01R 39/00* | (2006.01) |
| *H01R 4/60* | (2006.01) |
| *H01R 39/64* | (2006.01) |
| *G06F 1/16* | (2006.01) |
| *H01R 12/52* | (2011.01) |
| *H01R 107/00* | (2006.01) |

(52) U.S. Cl.
CPC ................ *H01R 4/60* (2013.01); *G06F 1/1683* (2013.01); *H01R 39/64* (2013.01); *H01R 12/52* (2013.01); *H01R 2107/00* (2013.01); *H01R 2201/06* (2013.01)

(58) Field of Classification Search
CPC ............ H01R 4/60; H01R 4/56; H01R 39/64; H01R 12/52; H01R 2201/06; G06F 1/1683

USPC .............................................. 439/11–15, 164
See application file for complete search history.

(56) References Cited

U.S. PATENT DOCUMENTS

| | | |
|---|---|---|
| 5,237,488 A | 8/1993 | Moser et al. |
| 5,897,382 A | 4/1999 | Takahashi |
| 2004/0002242 A1 | 1/2004 | Sasaki |
| 2013/0107465 A1* | 5/2013 | Huang et al. .................. 361/725 |

FOREIGN PATENT DOCUMENTS

JP          06-005161 U          1/1994

* cited by examiner

*Primary Examiner* — Javaid Nasri
(74) *Attorney, Agent, or Firm* — Jianq Chyun IP Office (57) ABSTRACT

A connector used for connecting to substrates and including bases and a shaft is provided. The bases are disposed on the substrates individually and include terminals embedded the base. The shaft is pivoted to the bases and includes a first element, a second element stacking with the first element and conductive rings. The second element includes first and second conductive circuits. The first conductive circuits are connected to the second conductive circuit, and each first and each second conductive circuit has a first pad and a second pad on the second element. The conductive rings are sleeved to the shaft, and connected to the first pad and the second pad electrically and individually. When the shaft is rotatably assembled to the bases, the first pads and the second pads are contact with the terminals electrically via the conductive rings and the conductive rings are capable of contacting with the terminals.

11 Claims, 10 Drawing Sheets

CONNECTOR AND THE METHOD FOR ASSEMBLING

CROSS-REFERENCE TO RELATED APPLICATION

This application claims the priority benefit of Taiwan application serial no. 102115074, filed on Apr. 26, 2013. The entirety of the above-mentioned patent application is hereby incorporated by reference herein and made a part of this specification.

FIELD OF THE INVENTION

The present invention generally relates to a connector, and more particularly, to a connector having a shaft.

DESCRIPTION OF RELATED ART

Along with the ongoing development of science technology, new generations of electronic products with more complex and user-friendly functions are coming forth to replace old products. Taking a note book computer as an example, a note book computer has the same function as a conventional personal computer, in addition due to the advantages of compact and light weight it is convenient for users to carry around. In recent years, the miniaturization of note book computers gradually becomes a design trend, and in order that touch function is guided to correspondingly meet the operating system, combining the note book computer with the tablet computer has become a certain trend.

For instance, when a first body of a note book computer is unfolded relative to the second body, the user can rotate the screen to rotate relative to the first body so as to adjust the screen to be in a better viewing angle, or the user can rotate the screen 180 degrees and folds up the first body and the second body so that the note book computer looks like a tablet computer. However, when the screen is rotated relative to the first body, for example rotated in a clockwise direction, along with it the transmission lines which connect the screen and the first body may also wind around. And if the screen is not rotated in a counterclockwise direction relative to the body, the transmission lines may be overly rotated and damages such as the transmission lines breaking off and the like may happen.

SUMMARY OF THE INVENTION

The disclosure provides a connector in which a body of an electronic device is capable to continuously rotate in a same rotating direction, and rotating back in a reverse direction to be repositioned to avoid connecting lines breaking is unnecessary.

The disclosure provides an assembling method of a connector, used for fixing the abovementioned connector to different substrates.

The connector provided in the disclosure is used for electrically connecting to a plurality of substrates and includes a plurality of bases and a shaft. The bases are individually disposed on the substrates, and include a plurality of terminals which are embedded in the bases. Each terminal has a fixing end electrically connected to the corresponding substrate and a contact end corresponding to the fixing end. The shaft is pivoted to the bases and includes a first element, a second element and a plurality of conductive rings. The first element and the second element are stacked to each other, wherein the second element includes a plurality of first conductive circuits and a plurality of second conductive circuits. The first conductive circuits are electrically connected to the second conductive circuits correspondingly. Each of the first conductive circuits and each of the second conductive circuits individually have a first pad and a second pad on a surface of the second element. The conductive rings are disposed around the two ends of the shaft and electrically connected to the corresponding first pads and the corresponding second pads individually. When the shaft is rotatably assembled to the bases, the first pads and the second pads are electrically connected to the terminals via the conductive rings, and the conductive rings are capable to continuously contact with the contact ends during the shaft being rotated relative to the bases.

The assembling method of a connector provided in the disclosure is used for fixing a connector to a plurality of substrates. The connector includes a plurality of bases and a shaft, and each of the bases includes a plurality of terminals. Each terminal has a fixing end electrically connected to the corresponding substrate and a contact end corresponding to the fixing end. The shaft is pivoted to the bases and includes a first element, a second element and a plurality of conductive rings. The second element includes a plurality of first conductive circuits and a plurality of second conductive circuits. The first conductive circuits are electrically connected to the second conductive circuits correspondingly. Each of the first conductive circuits and each of the second conductive circuits individually have a first pad and a second pad on a surface of the second element. The assembling method includes disposing the bases on the substrates, stacking the first element and the second element to each other wherein all of the first conductive circuits and the second conductive circuits of the second element are covered by the first element, individually disposing the conductive rings around the second element to be conducted with the first pads and the second pads, assembling the supporting member between the first element and the second element so that the first element and the second element are pushed outward to fix the conductive rings to complete the shaft assembling, and assembling the shaft to the bases on the substrates.

In light of the above, in the connector of the disclosure, the shaft is pivoted to a plurality of bases and the bases are individually disposed on different substrates. The conductive circuits of the two ends of the second element are conducted with each other, and every end of the conductive circuits are conducted with the conductive rings via the pads to contact with the terminals of the corresponding base via the conductive rings. When the shaft is rotated relative to the bases, the conductive rings continuously contact with the terminals so that the terminals and the corresponding conductive circuits are conducted. Therefore, when the connector of the disclosure is applied to the transmission lines connected between different bodies of an electronic device, the connector can maintain the conductivity of the transmission lines during the rotating of the bodies, and the bodies are no need to be rotated in a reverse direction to be repositioned.

To make the above features and advantages of the present invention more 1427 comprehensible, several embodiments accompanied with drawings are described in detail as follows.

BRIEF DESCRIPTION OF THE DRAWINGS

The accompanying drawings constituting a part of this specification are incorporated herein to provide a further understanding of the disclosure. Here, the drawings illustrate embodiments of the disclosure and, together with the description, serve to explain the principles of the disclosure.

DESCRIPTION OF EMBODIMENTS

Figure 1A:
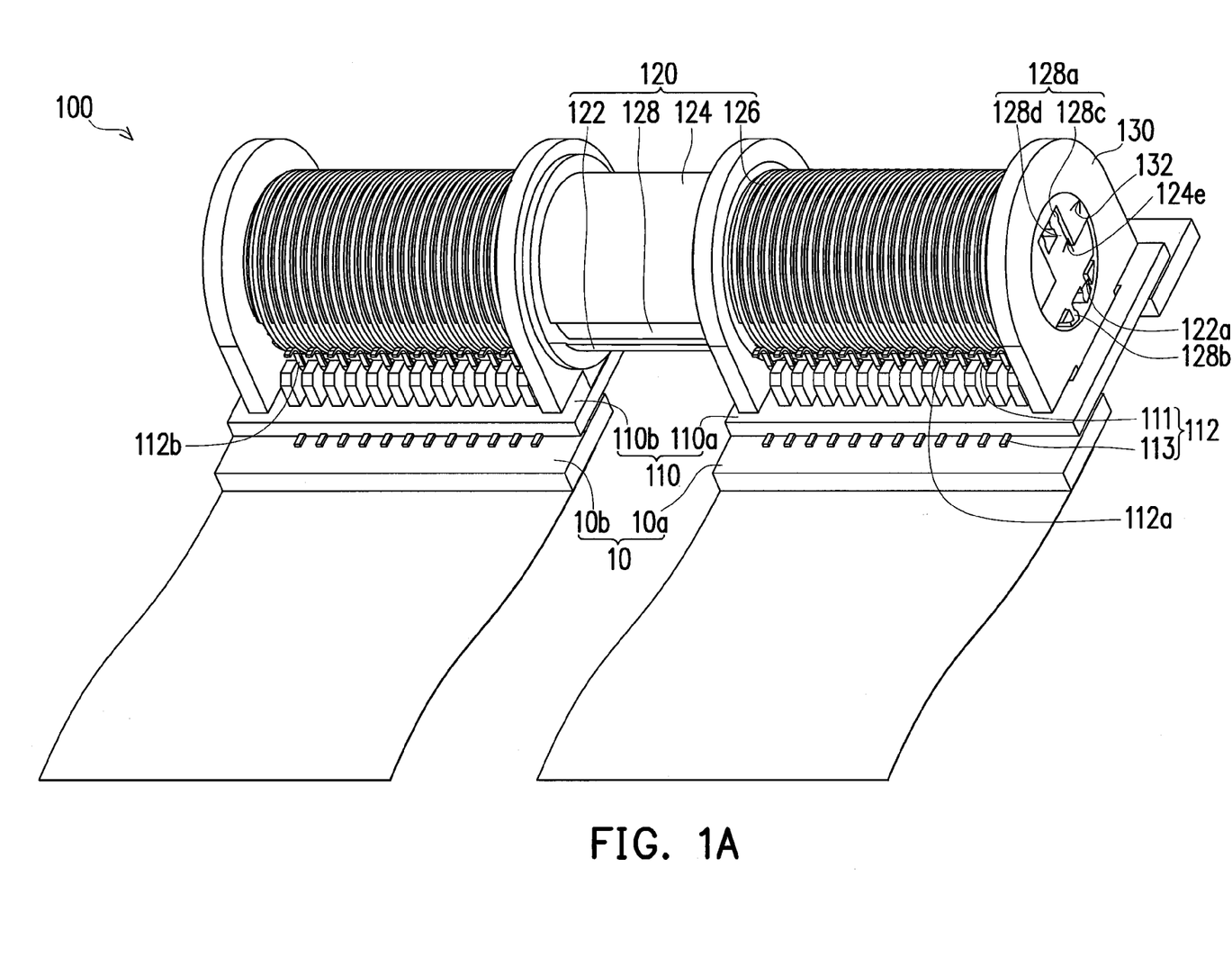
FIG. 1A is a schematic view of a connector according to an exemplary embodiment of the disclosure.
Figure 1B:
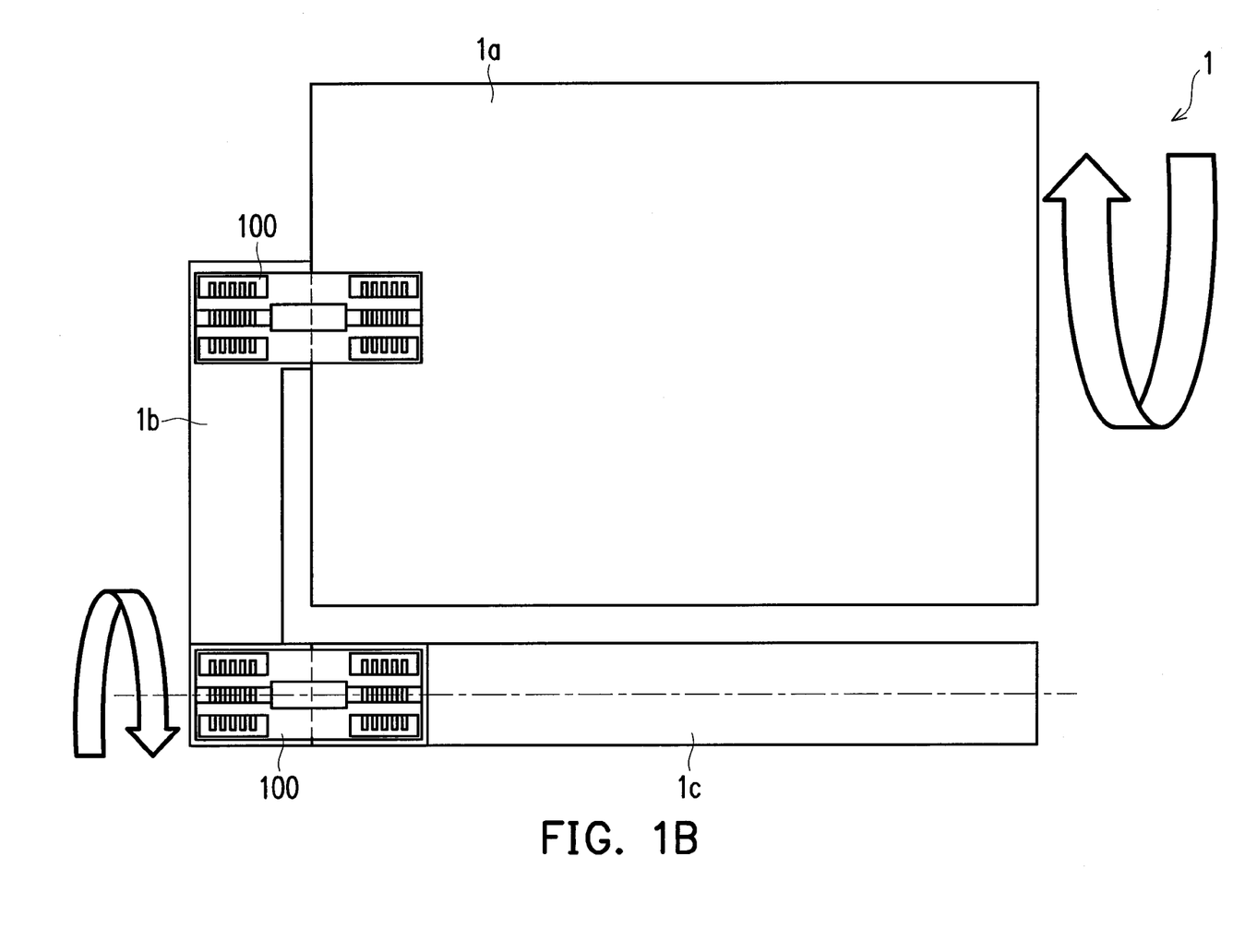
FIG. 1B is a schematic view of an electronic device in which the connector of FIG. 1A is employed.
Figure 2A:
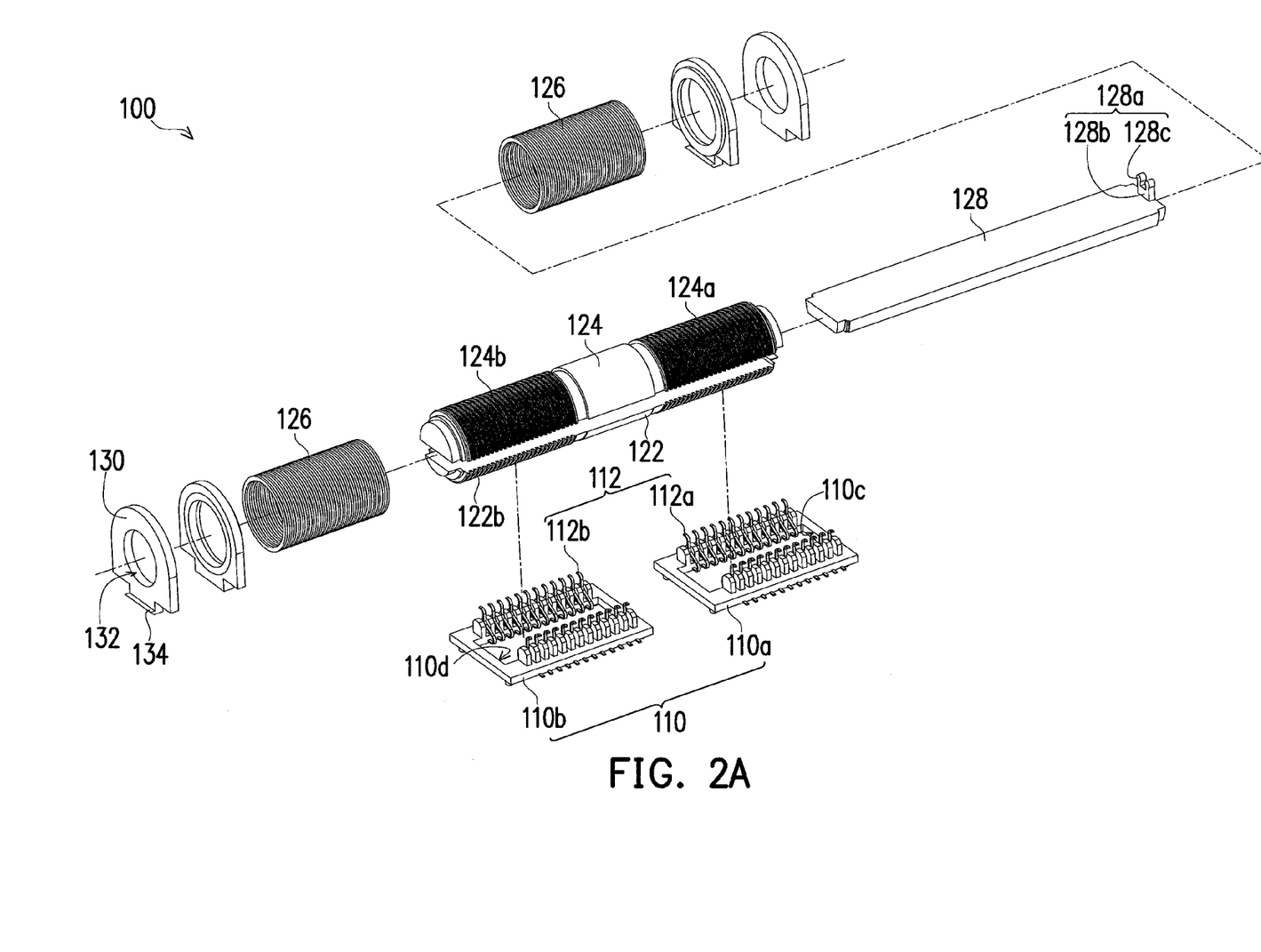
FIG. 2A is an exploded view of the shaft depicted in FIG. 1A.

FIG. 1A is a schematic view of a connector according to an exemplary embodiment of the disclosure. FIG. 1B is a schematic view of an electronic device in which the connector of FIG. 1A is employed. FIG. 2A is an exploded view of the shaft depicted in FIG. 1A. Referring to FIG. 1A through FIG. 2A, in the embodiment, the connector 100 is used for electrically connecting to a plurality of substrates 10 and includes a plurality of bases 110 and a shaft 120. The bases 110 are individually disposed on the substrates 10, and include a plurality of terminals 112 which are embedded in the bases 110. Each terminal 112 has a fixing end 111 electrically connected to the corresponding substrate 10 and a contact end 113 corresponding to the fixing end 111. The shaft 120 is pivoted to the bases 110 and includes a first element 122, a second element 124 and a plurality of conductive rings 126. The first element 122 and the second element 124 are stacked to each other, wherein the two ends of the second element 124 includes a plurality of first conductive circuits 123 and a plurality of second conductive circuits 125. The first conductive circuits 123 are electrically connected to the second conductive circuits 125 correspondingly. Each of the first conductive circuits 123 and each of the second conductive circuits 125 individually have a first pad 124a and a second pad 124b on a surface of the second element 124. The conductive rings 126 are disposed around the two ends of the shaft 120 and electrically connected to the corresponding first pads 124a and the corresponding second pads 124b individually. When the shaft 120 is rotatably assembled to the bases 110, the first pads 124a and the second pads 124b are electrically connected to the terminals 112 via the conductive rings 126, and the conductive rings 126 are capable to continuously contact with the contact ends 113 during the shaft 120 being rotated relative to the bases 110.

In the embodiment, the connector 100 can be a transmission circuit located between the bodies which are pivoted to each other in an electronic device 1. For example, the electronic device 1 can be a note book computer and includes a screen 1a, a linkage 1b and a host 1c. The connector 100 can be applied between the screen 1a and the linkage 1b or between the linkage 1b and the host 1c. The bases 110 are individually disposed on the substrates 10 of the different bodies, and the shaft 120 is pivoted to the bases 110. The first conductive circuits 123 and the second conductive circuits 125 of the two ends of the shaft 120 are conducted with each other, and each conductive circuit 123, 125 can be conducted with the conductive rings 126 via the pads 124a, 124b and contact with the terminals 112 of the corresponding base 110 via the conductive rings 126. In the embodiment, when the shaft 120 is rotated relative to the bases 110, the conductive rings 126 can continuously contact with the terminals 112 and conduct with the corresponding conductive circuits 123, 125. Therefore, if the electronic device 1 uses the connector 100 for connecting to the transmission circuit between the screen 1a and the linkage 1b or between the linkage 1b and the host 1c, the screen 1a of the electronic device 1 can continuously rotate in the same rotating direction and no need to rotate in a reverse direction to be repositioned, and thus it enhances the convenience for users in operation.

Figure 2B:
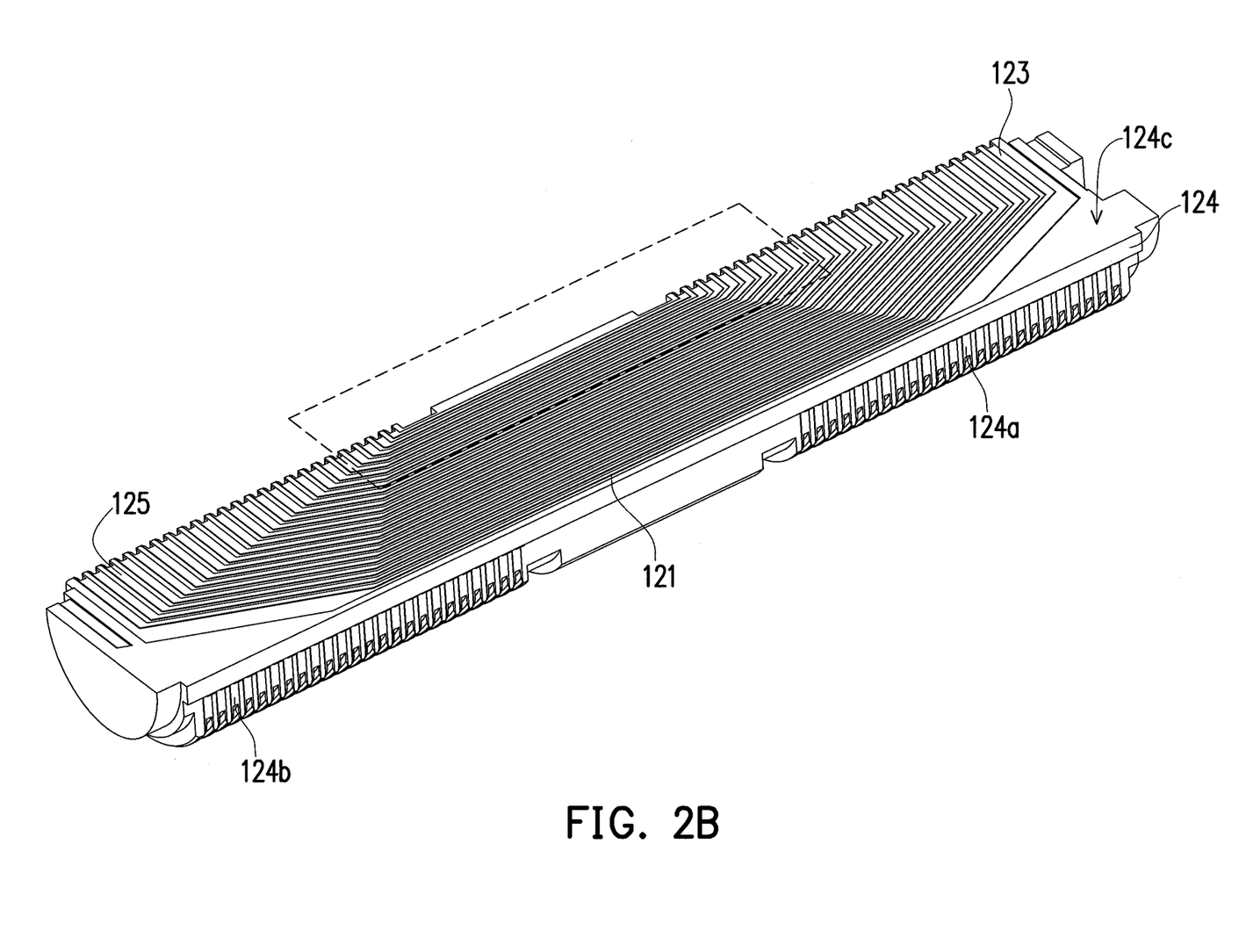
FIG. 2B is a schematic view illustrating the second element depicted in FIG. 2A from another view angle.
Figure 2C:
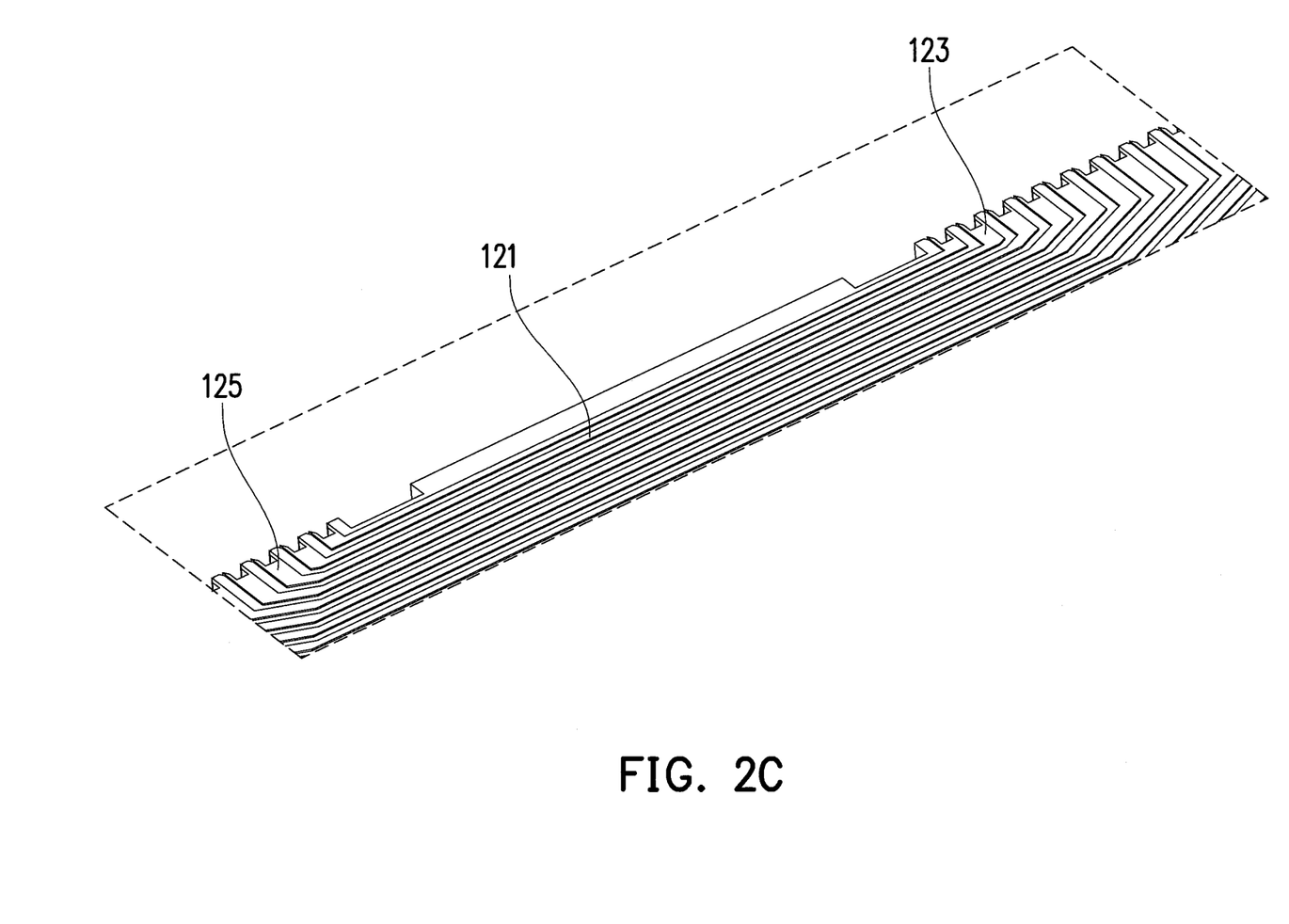
FIG. 2C is a schematic partially enlarged view of FIG. 2B.

FIG. 2B is a schematic view illustrating the second element depicted in FIG. 2A from another view angle. FIG. 2C is a schematic partially enlarged view of FIG. 2B. Referring to FIG. 2A through FIG. 2C, in the embodiment, the first conductive circuits 123 are electrically connected to the second conductive circuits 125 correspondingly. Each of the first conductive circuits 123 and each of the second conductive circuits 125 individually have a first pad 124a and a second pad 124b on a surface of the second element 125. In more detailed, as shown in FIG. 2B, the second element 124 further includes a plurality of connecting circuits 121. The first conductive circuits 123, the second conductive circuits 125 and the connecting circuits 121 are disposed on an inner surface 124c of the second element 124 which faces the first element 122. The connecting circuits 121 correspondingly connect the first conductive circuits 123 and the second conductive circuits 125, so that the first conductive circuits 123 are electrically connected to the second conductive circuits 125 correspondingly.

In other words, as shown in FIG. 2B, the quantity of the circuits 121 and that of the first conductive circuits 123 and the second conductive circuits 125 are the same, and each of the connecting circuits 121 corresponds to a single first conductive circuit 123 and second conductive circuit 125. On the external surface of the second element 124, each of the first conductive circuits 123 and each of the second conductive circuits 125 individually have a first pad 124a and a second pad 124b so as to contact with the conductive rings 126. In the embodiment, the two ends of the second element 124 has a plurality of grooves 124d, wherein the first pads 124a and the second pads 124b are located in the grooves 124d and the conductive rings 126 are assembled to the grooves 124d. Referring to FIG. 2C, the first pads 124a and the second pads 124b are located in the grooves 124d and fill up to the bottom and the side surface of the grooves 124d. In other words, the contact areas between the first pads 124a and the conductive rings 126, and between the second pads 124b and the conductive rings 126, are large, and thus the poor contact between the pads 124a, 124b and the conductive rings 126 and causing the contact resistance being too high can be avoided. In addition, the first element 122 also has a plurality of grooves 122b which are aligned with the grooves 124d of the second element 124.

In the embodiment, the first conductive circuits 123, the second conductive circuits 125 and the connecting circuits 121 can be manufactured by the same process. For example, a laser direct structuring (LDS) process can be used for fabricating the first conductive circuits 123, the second conductive circuits 125 and the connecting circuits 121. In detailed, after the circuit locations for the first conductive circuits 123, the second conductive circuits 125 and the connecting circuits 121 are manufactured by using laser, then by using electroplating process metal materials can be fixed to the circuit locations on the second element 124 to form the circuits. However, the method of fabricating the circuit of the invention is not limited to the above.

In the embodiment, the quantity of the bases 110 of the connector 100 is two and the bases 110 include a first base 110a and a second base 110b, and the substrates 10 correspondingly include a first substrate 10a and a second substrate 10b. Similarly, the terminals 112 include the first terminals 112a disposed on the first base 110a and the second terminals 112b disposed on the second base 110b. The first base 110a is disposed on the first substrate 10a, and the second base 110b is disposed on the second substrate 10b. The first conductive circuits 123 correspond to the first terminals 112a disposed on the first base 110a and the second conductive circuits 125 correspond to the second terminals 112b disposed on the second base 110b. In other words, in the embodiment, the first base 110a is disposed at the screen 1a of the electronic device 1, and the second base 110b is disposed at the linkage 1b of the electronic device 1. The shaft 120 is pivoted to the first base 110a and the second base 110b and connects the screen 1a and the linkage 1b, or connects the linkage 1b and the host 1c, via the first and second conductive circuits 123, 125 located at the two ends of the second element 124. However, the present invention is not intended to limit the shaft 120 to be pivoted to the first base 110a and the second base 110b. In other embodiments not shown in the figures of the disclosure, the shaft can be disposed to three or more bases as required, and regarding the shaft, third conductive circuits or other conductive circuits can also be increased to the shaft according to the quantity of the bases, so that the connector can be applied to different electronic devices.

As shown in FIG. 2A, the first base 110a and the second base 110b individually have a first opening 110c and a second opening 110d. The terminals 112 of the first base 110a and the second base 110b are disposed on at least one side of the first opening 110c and the second opening 110d. In other words, through the first opening 110c and the second opening 110d disposed on the first base 110a and the second base 110b, the height in which the terminals 112 are embedded in the bases 110 can be reduced. When the shaft 120 is assembled to the bases 110, the shaft 120 can be closer to the substrates 10, so as to reduce the height of the connector 100. In addition, in the embodiment, the first terminals 112a of the first base 110a are disposed on two opposite sides of the first opening 110c, and the second terminals 112b of the second base 110b are disposed on two opposite sides of the second opening 110d. The first terminals 112a and the second terminals 112b located at the two sides of the first opening 110c and the second opening 110d are alternately arranged, so as to reduce the length of each opening.

In FIG. 2A, the shaft 120 further includes a supporting member 128, and the supporting member 128 is disposed between the first element 122 and the second element 124. The supporting member 128 is used for relatively pushing outward the first element 122 and the second element 124, so that the conductive rings 126 can be firmly locked in the grooves 124d of the second element 124 and firmly propped against the first pads 124a and the second pads 124b. The material of the supporting member 128 is plastic, for example. However, the present invention is not limited thereto. A buckling method can be used in fixing the supporting member 128 to the first element 122 and the second element 124. For example, an end of the supporting member 128 has a first support positioning portion 128a and a second support positioning portion 128b, wherein an end of the first element 122 correspondingly has a first positioning portion 122a, and an end of the second element 124 correspondingly has a second positioning portion 124e. When the first element 122, the supporting member 128 and the second element 124 construct the shaft 120, the first support positioning portion 128a and the first positioning portion 122a are positioned to each other, and the second support positioning portion 128b and the second positioning portion 124e are positioned to each other. In detailed, as shown in FIG. 2A and FIG. 2B, the first positioning portion 122a and the second positioning portion 124e are recesses, and the first support positioning portion 128a and the second support positioning portion 128b are protrusions. Taking the first support positioning portion 128a as an example, the first support positioning portion 128a includes an elastic arm 128d and a ball portion 128c. When the supporting member 128 is assembled between the first element 122 and the second element 124, the ball portion 128c interferes with the inner surface of the recess, so that the elastic arm 128d deforms and the ball portion 128c is assembled to the recess of the first positioning portion 122a. Similarly, the second support positioning portion 128b can also be assembled to the second positioning portion 124e, and it is not repeated herein.

Moreover, the connector 100 of the embodiment further includes a plurality of fixing members 130, and the material of the fixing members 130 is nylon, however the present invention is not limited thereto. The fixing members 130 are disposed at the two ends of the bases 110 (in the present embodiment, the first base 110a and the second base 110b). Each of the fixing members 130 has a hole 132 and a buckling portion 134. Each fixing member 130 is fixed to each of the bases 110 through the buckling portion 134. The shaft 120 is assembled to the hole 132 of each fixing member 130 so as to rotate relative to the bases 110. In other words, at each of the two sides of the first base 110a and the second base 110b, the fixing members 130 are disposed thereto, and the bottom of each fixing member 130 has a buckling portion 134, wherein the buckling portion 134 is a locking hook, for example. Since the first base 110a and the second base 110b are arranged side by side, the fixing members 130 can be arranged along the same direction, so that the shaft 120 can be pivoted in the holes 132 of the fixing members 130. In addition, in the embodiment, a lubrication layer (not shown) is further disposed between the shaft 120 and the hole 132 of the fixing member 130, so as to reduce the friction force between the shaft 120 and the bases 110 when relatively rotated.

Figure 3A:
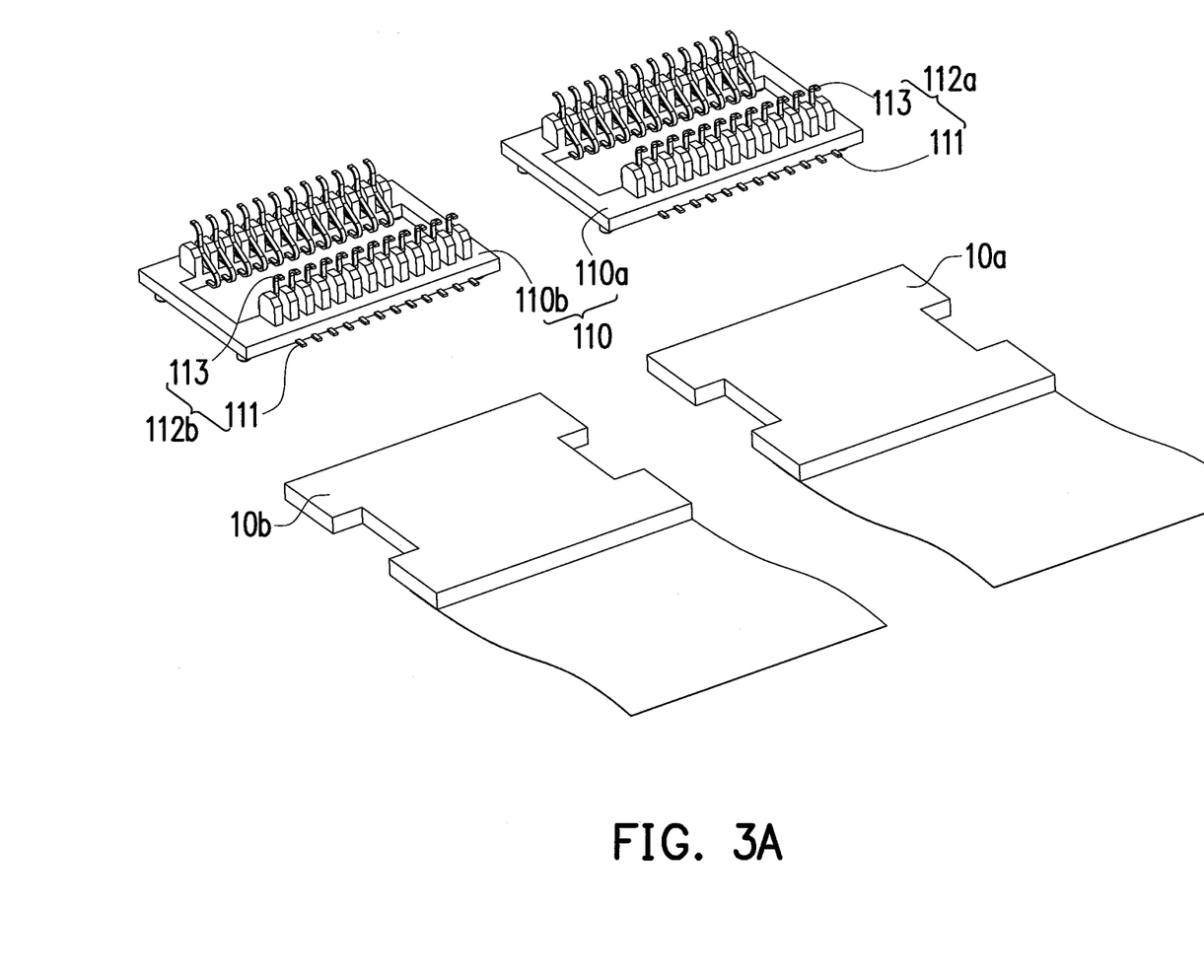
FIG. 3A to FIG. 3E are schematic views illustrating the process steps of the assembling of the connector depicted in FIG. 1A.
Figure 3B:
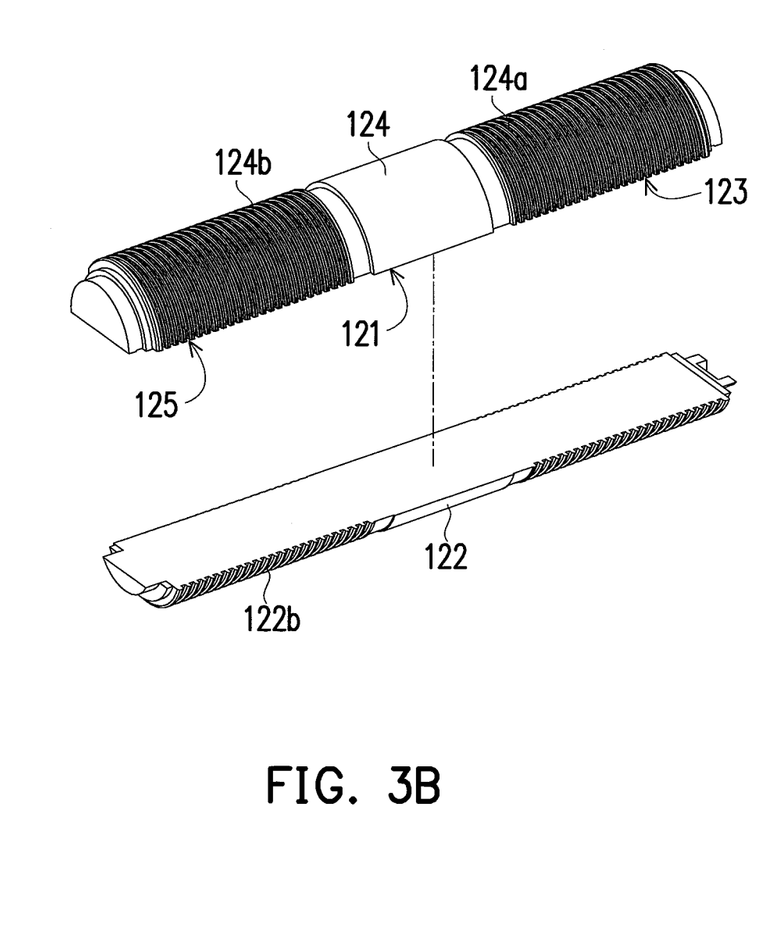

FIG. 3A to FIG. 3E are schematic views illustrating the process steps of the assembling of the connector depicted in FIG. 1A. Referring to FIG. 3A through FIG. 3E, in the assembling process shown in FIG. 3A through FIG. 3E, the assembling method of the connector 100 are described in FIG. 3A, first the first base 110a and the second base 110b are individually disposed on the first substrate 10a and the second substrate 10b. For example, by using a reflow process, the fixing ends 111 of the first terminals 112a and the second terminals 112b can be fixed to the first substrate 10a and the second substrate 10b. As shown in FIG. 3B, the first element 122 and the second element 124 are stacked to each other, wherein all of the first conductive circuits 123, the second conductive circuits 125 and the connecting circuits 121 of the second element 124 are covered by the first element 122.

Figure 3C:
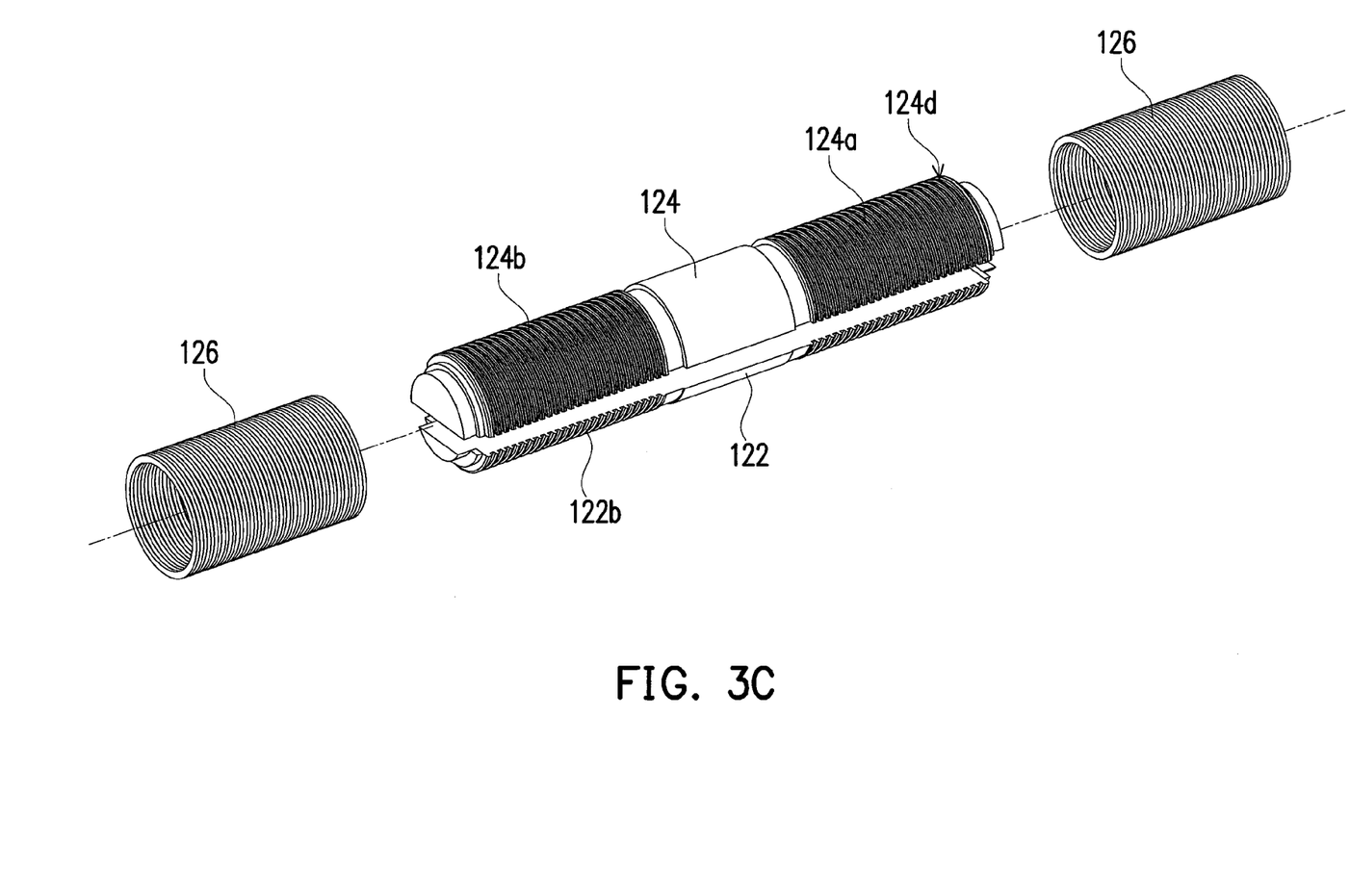
Figure 3D:
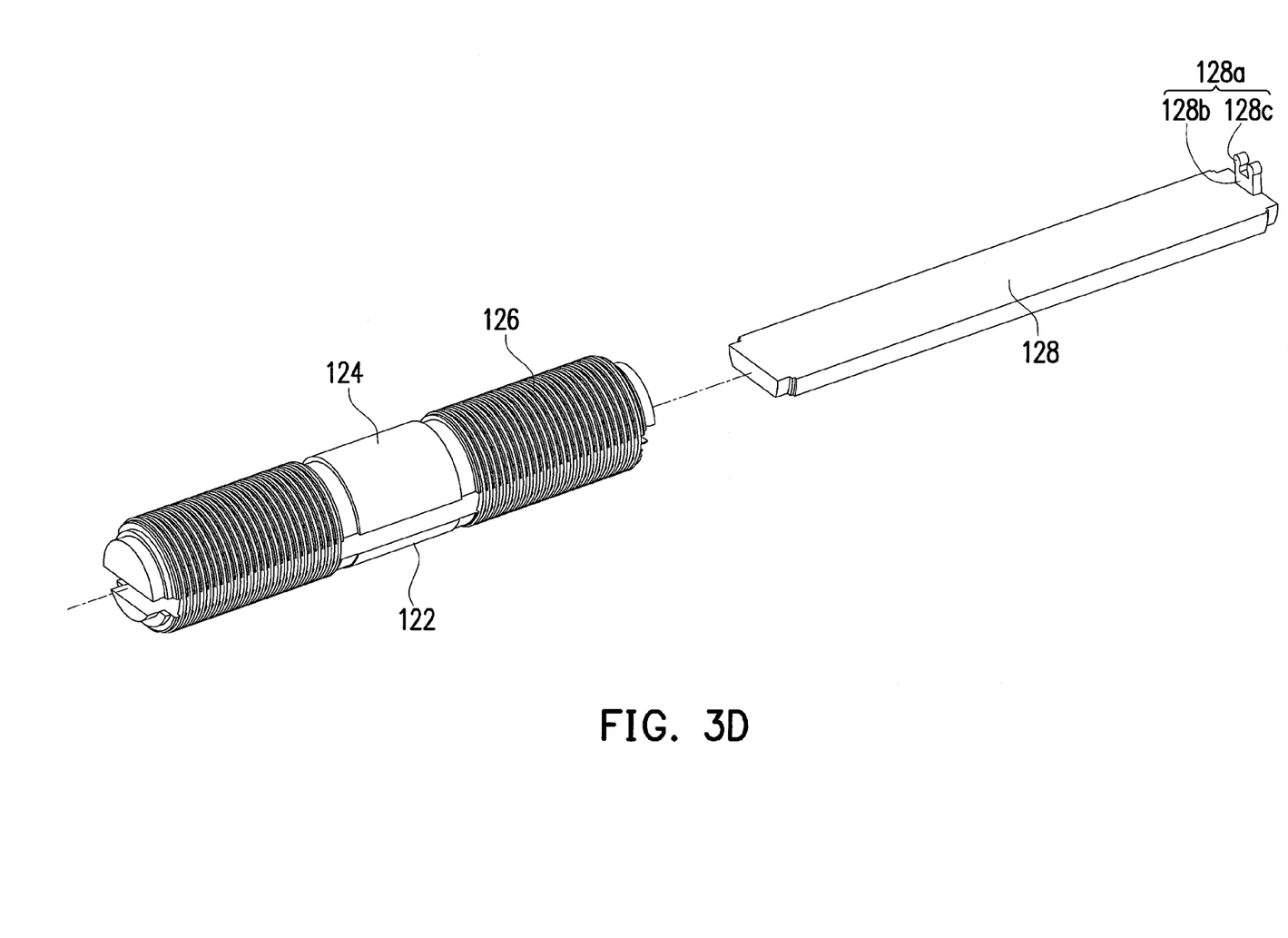
Figure 3E:
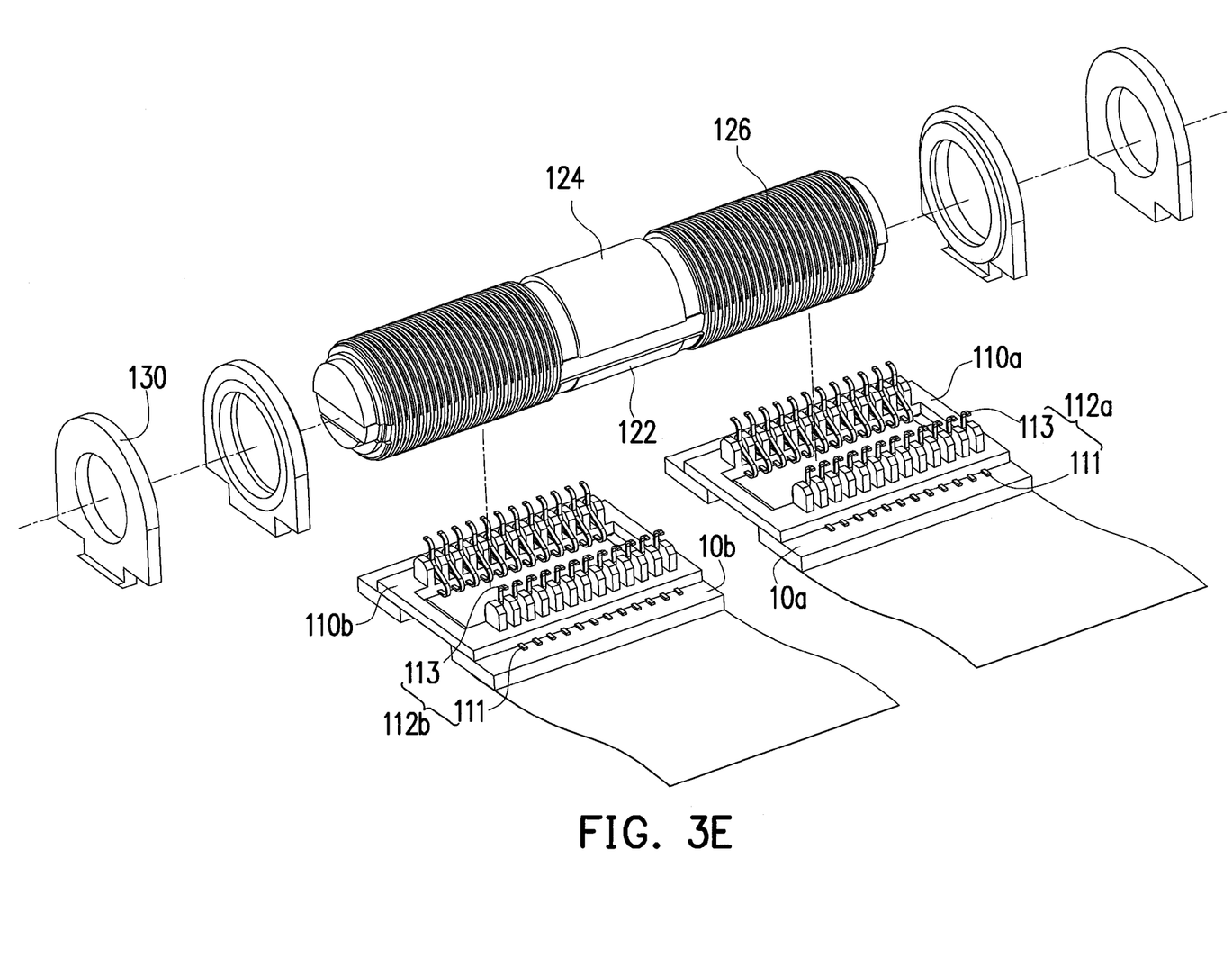

Then, as shown in FIG. 3C, the conductive rings 126 are disposed around the recesses 124d of the element 124 and conducted to the corresponding first pads 124a and the corresponding second pads 124b individually. After the conductive rings 126 are disposed around the recesses 124d of second element 124, as shown in FIG. 3D, the supporting member 128 is assembled between the first element 122 and the second element 124, so that the first element 122 and the second element 124 are pushed outward to fix the conductive rings 126 and complete the shaft 120 assembling. Finally, as shown in FIG. 3E, the fixing members 130 are assembled to the constructed shaft 120 and then it is assembled to the first base 110a and the second base 110b of the first substrate 10a and the second substrate 10b, so as to complete the assembling process of the connector 100.

In light of the foregoing, in the connector of the disclosure, the shaft is pivoted to a plurality of bases and the bases are individually disposed on different substrates. The conductive circuits of the two ends of the second element are conducted with each other, and every end of the conductive circuits are conducted with the conductive rings via the pads to contact with the terminals of the corresponding base via the conductive rings. When the shaft is rotated relative to the bases, the conductive rings continuously contact with the terminals so that the terminals and the corresponding conductive circuits are conducted. Furthermore, the inner portion of the second element further includes connecting circuits for connecting the conductive circuits located at the two ends of the second element. The first pads and the second pads are disposed on the bottom of the grooves located on the external surface of the element, and the conductive rings are assembled to the grooves to ensure to have a good contact. Therefore, when the connector of the disclosure is applied to the transmission lines connected between different bodies of an electronic device, the connector can maintain the conductivity of the transmission lines during the rotating of the bodies, and the bodies are no need to be rotated in a reverse direction to be repositioned.

Although the present invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A connector, for connecting to a plurality of substrates, the connector comprising:
   a plurality of bases disposed on the substrates individually, each of the bases comprising:
      a plurality of terminals embedded in the bases, wherein each terminal has a fixing end which is electrically connected to the corresponding substrate and a contact end which is related to the fixing end; and
   a shaft pivoted to the bases, the shaft comprising:
      a first element;
      a second element stacked with the first element, two ends of the second element comprising a plurality of first conductive circuits and a plurality of second conductive circuits, wherein the first conductive circuits are electrically connected to the second conductive circuits correspondingly, and each of the first conductive circuits and each of the second conductive circuits have a first pad and a second pad on a surface of the second element individually; and
      a plurality of conductive rings disposed around two ends of the shaft and electrically connected to the corresponding first and second pads individually, wherein when the shaft is rotatably assembled to the bases, the first pads and the second pads are electrically connected to the terminals through the conductive rings, and the conductive rings are adapted to continuously contact with the contact ends during the shaft being rotated related to the bases.

2. The connector as claimed in claim 1, wherein the second element further comprises a plurality of connecting circuits correspondingly connected to the first conductive circuits and the second conductive circuits so that the first conductive circuits are electrically connected to the second conductive circuits, and the first conductive circuits, the second conductive circuits and the connecting circuits are disposed on a surface of the second element wherein the surface faces the first element.

3. The connector as claimed in claim 1, wherein the quantity of the bases is two and the bases comprises a first base and a second base, the substrates correspondingly comprises a first substrate and a second substrate, the first base is disposed on the first substrate, the second base is disposed on the second substrate, the first conductive circuits correspond to a plurality of first terminals of the terminals disposed on the first base, and the second conductive circuits correspond to a plurality of second terminals of the terminals disposed on the second base.

4. The connector as claimed in claim 3, wherein the first base has a first opening and the second base has a second opening, and the terminals of the first base are disposed on at least one side of the first opening and the terminals of the second base are disposed on at least one side of the second opening.

5. The connector as claimed in claim 4, wherein the terminals are disposed on two sides of the first opening and the second opening, and the terminals are alternately arranged.

6. The connector as claimed in claim 1, wherein two ends of the second element have a plurality of grooves, the first pads and the second pads are located in the grooves, and the conductive rings are assembled to the grooves.

7. The connector as claimed in claim 1, further comprising a plurality of fixing members disposed at two ends of the bases, wherein each fixing member has a hole and a buckling portion, each fixing member is fixed to each base via the buckling portion, and the shaft is assembled to the hole of each fixing member so as to rotate relative to the base.

8. The connector as claimed in claim 1, wherein the shaft further comprises a supporting member disposed between the first element and the second element, so that the conductive rings prop against to the first pads and the second pads.

9. The connector as claimed in claim 8, wherein an end of the supporting member has a first support positioning portion and a second support positioning portion, an end of the first element correspondingly has a first positioning portion, an end of the second element correspondingly has a second positioning, when the first element, the supporting member and the second element construct the shaft, the first support positioning portion and the first positioning portion are positioned to each other and the second support positioning portion and the second positioning portion are positioned to each other.

10. An assembling method of a connector, used for fixing a connector to a plurality of substrates, the connector comprising a plurality of bases and a shaft, each of the bases comprising a plurality of terminals, wherein each ten Anal has a fixing end electrically connected to the corresponding substrate and a contact end corresponding to the fixing end, the shaft is pivoted to the bases and comprises a first element, a second element and a plurality of conductive rings, two ends of the second element comprises a plurality of first conductive circuits and a second conductive circuits, the first conductive circuits are electrically connected to the second conductive circuits correspondingly, and each of the first conductive circuits and each of the second conductive circuits individually have a first pad and a second pad on a surface of the second element, the assembling method comprising:
   disposing the bases on the substrates individually;
   stacking the first element and the second element to each other, wherein the first conductive circuits and the second conductive circuits of the second element are covered by the first element;
   disposing the conductive rings around the second element so as to be individually conducted with the first pads and the second pads;

assembling a supporting member between the first element and the second element, so that the first element and the second element are pushed outward to fix the conductive rings and complete the shaft assembling; and assembling the shaft to the bases located on the substrates.

11. The assembling method of a connector as claimed in claim 10, wherein a step of assembling the shaft to the bases located on the substrates further comprises: after assembling a plurality of fixing members to two sides of the shaft, then assembling the shaft to the bases located on the substrates.

\* \* \* \* \*